US012589924B2

(12) United States Patent
Kintscher et al.

(10) Patent No.: US 12,589,924 B2
(45) Date of Patent: Mar. 31, 2026

(54) CONTAINER CLOSURE WITH A SEALING ELEMENT

(71) Applicants: SILGAN HOLDINGS, INC., Stamford, CT (US); SILGAN WHITE CAP MANUFACTURING GMBH, Hanover (DE)

(72) Inventors: Juergen Kintscher, Wedemark (DE); Andreas Maniera, Neustadt (DE)

(73) Assignee: SILGAN HOLDINGS, INC., Stamford, CT (US)

( * ) Notice: Subject to any disclaimer, the term of this patent is extended or adjusted under 35 U.S.C. 154(b) by 1091 days.

(21) Appl. No.: 17/262,328

(22) PCT Filed: May 17, 2019

(86) PCT No.: PCT/IB2019/054106
§ 371 (c)(1),
(2) Date: Jul. 19, 2021

(87) PCT Pub. No.: WO2020/021348
PCT Pub. Date: Jan. 30, 2020

(65) Prior Publication Data
US 2021/0339919 A1 Nov. 4, 2021

(30) Foreign Application Priority Data

Jul. 23, 2018 (DE) .......................... 102018117766.6
Nov. 12, 2018 (DE) .......................... 102018128283.4

(51) Int. Cl.
B65D 51/14 (2006.01)
B65D 53/02 (2006.01)
C08L 23/20 (2025.01)

(52) U.S. Cl.
CPC ........... B65D 51/145 (2013.01); B65D 53/02 (2013.01); C08L 23/20 (2013.01); B32B 2435/02 (2013.01);
(Continued)

(58) Field of Classification Search
CPC ........... B29L 2031/56; B29L 2031/565; B29K 2023/18; B32B 2435/00; B32B 2435/02
(Continued)

(56) References Cited

U.S. PATENT DOCUMENTS 4,198,369 A * 4/1980 Yoshikawa ............. B29C 70/80
427/236
4,327,840 A * 5/1982 Mori ....................... B29C 48/06
215/349
(Continued)

FOREIGN PATENT DOCUMENTS

DE 10 2018 113 157 A1 12/2019
DE 102018128283 A1 1/2020
(Continued)

OTHER PUBLICATIONS

International Search and Written Opinion dated Sep. 20, 2019 for International Application PCT/IB2019/054106.

*Primary Examiner* — Michael C Romanowski
(74) *Attorney, Agent, or Firm* — HUNTON ANDREWS KURTH LLP

(57) ABSTRACT

The invention relates to a container closure (1, 21, 41, 61) with a sealing element (3, 23, 43, 63). The sealing element (3, 23, 43, 63) comprises a polymer composition. The polymer composition comprises a butene copolymer. The butene copolymer has a melting temperature Tm of between 30° C. and 130° C., wherein the melting temperature Tm is determined by the second heating curve of a DSC measurement at a heating rate of 10° C. $\text{min}^{-1}$.

29 Claims, 6 Drawing Sheets

(52) U.S. Cl.
CPC ....... *C08L 2201/14* (2013.01); *C08L 2205/02*
(2013.01); *C08L 2205/03* (2013.01)

(58) Field of Classification Search
USPC ........................ 428/34.1–36.92; 215/200–364
See application file for complete search history.

(56) References Cited

U.S. PATENT DOCUMENTS

| | | | | |
|---|---|---|---|---|
| 4,677,025 A * | 6/1987 | Davison | ................. | B32B 27/08 |
| | | | | 525/193 |
| 4,726,999 A * | 2/1988 | Kohyama | ............... | B32B 27/32 |
| | | | | 525/240 |
| 4,734,328 A * | 3/1988 | Kohyama | ............. | C09J 123/10 |
| | | | | 428/335 |
| 4,863,030 A * | 9/1989 | Bayer | ................ | B65D 21/0209 |
| | | | | 206/427 |
| 5,381,914 A * | 1/1995 | Koyama | ............. | B65D 51/244 |
| | | | | 426/118 |
| 5,476,914 A | 12/1995 | Ewen | | |
| 5,626,929 A * | 5/1997 | Stevenson | ............... | B32B 15/20 |
| | | | | 428/35.8 |
| 5,769,255 A * | 6/1998 | Ohmi | ................... | B65D 41/045 |
| | | | | 215/343 |
| 6,235,822 B1 * | 5/2001 | Whetten | ............... | B65D 53/06 |
| | | | | 526/348.3 |
| 6,573,334 B1 * | 6/2003 | Pitteri | .................... | C08L 23/10 |
| | | | | 524/502 |
| 7,182,986 B1 * | 2/2007 | Haneda | ................ | B29C 43/146 |
| | | | | 215/349 |
| 2002/0160137 A1 * | 10/2002 | Varma | ................. | C08L 53/025 |
| | | | | 525/95 |
| 2003/0018114 A1 * | 1/2003 | Tai | .......................... | C08L 29/04 |
| | | | | 524/413 |
| 2005/0148720 A1 * | 7/2005 | Li | ........................... | C08K 5/01 |
| | | | | 524/543 |
| 2006/0189744 A1 | 8/2006 | Tse | | |
| 2007/0251572 A1 * | 11/2007 | Hoya | ........................ | C08J 5/18 |
| | | | | 174/110 SR |
| 2008/0269388 A1 * | 10/2008 | Markovich | ............. | C08L 55/02 |
| | | | | 524/505 |
| 2009/0205776 A1 * | 8/2009 | Datta | ..................... | C08L 53/00 |
| | | | | 525/89 |
| 2010/0121011 A1 * | 5/2010 | Pellegatti | .............. | C08F 210/08 |
| | | | | 526/170 |
| 2010/0295211 A1 * | 11/2010 | Poel-Asendorf | ... | B65D 41/0485 |
| | | | | 264/268 |
| 2011/0003939 A1 * | 1/2011 | Spataro | ................. | C08L 23/142 |
| | | | | 526/127 |
| 2012/0118785 A1 * | 5/2012 | Kainz | .................... | B65D 25/14 |
| | | | | 413/1 |
| 2012/0125801 A1 * | 5/2012 | Kainz | .................... | B65D 25/14 |
| | | | | 413/1 |
| 2012/0264883 A1 * | 10/2012 | Pellegatti | ................ | C08L 23/16 |
| | | | | 525/240 |
| 2013/0205718 A1 * | 8/2013 | Kapolas | ............. | B65D 79/0087 |
| | | | | 220/212 |
| 2014/0209611 A1 * | 7/2014 | Mangel | ................... | C09K 3/10 |
| | | | | 220/378 |
| 2015/0051350 A1 * | 2/2015 | Ferrari | .................... | C08L 23/20 |
| | | | | 525/240 |
| 2015/0061184 A1 * | 3/2015 | Poel-Asendorf | ...... | B29C 43/184 |
| | | | | 264/249 |
| 2016/0009909 A1 | 1/2016 | Lopez | | |
| 2017/0335094 A1 * | 11/2017 | Marchini | ................ | C08L 23/20 |
| 2018/0346621 A1 * | 12/2018 | Marchini | ............. | B29C 48/022 |
| 2021/0130509 A1 * | 5/2021 | Marchini | ............. | C08F 4/65912 |
| 2021/0130515 A1 * | 5/2021 | Marchini | ............. | C08F 210/16 |
| 2021/0147587 A1 * | 5/2021 | Marchini | ................ | C08F 10/08 |

FOREIGN PATENT DOCUMENTS

| | | | | | |
|---|---|---|---|---|---|
| EP | | 1358068 B1 * | 6/2006 | ............. | B32B 27/08 |
| EP | | 2 248 852 A1 | 10/2010 | | |
| EP | | 2049579 B1 * | 5/2012 | ........... | C08F 210/08 |
| JP | | S54155253 A | 7/1979 | | |
| JP | | S54158456 A | 12/1979 | | |
| JP | | 2014-047252 A | 3/2014 | | |
| JP | | 2005105105 A | 4/2021 | | |
| JP | | 2004204012 A | 7/2022 | | |
| WO | | 2002031044 A1 | 4/2002 | | |
| WO | | 2006128646 A2 | 12/2006 | | |
| WO | | 2007120147 A1 | 10/2007 | | |
| WO | | 2008087041 A | 7/2008 | | |
| WO | | 2016188982 A1 | 12/2016 | | |
| WO | | 2017025268 A1 | 2/2017 | | |
| WO | | 2017162817 A1 | 9/2017 | | |
| WO | WO-2018108228 A1 * | | 6/2018 | ............. | C08L 23/16 |

* cited by examiner

FIG. 9

CONTAINER CLOSURE WITH A SEALING ELEMENT

The invention relates to a sealing element made of a polymer composition contained in a closure, wherein a container sealed with the closure shows excellent sealing properties.

Polymer compositions contained in closures are known in the state of the art. Specifically, polymer compositions not containing PVC show some disadvantages in contrast to those compositions containing PVC. For example, PVC-free polymer compositions are relatively cost-intensive. In addition, the workability of PVC-free polymer compositions may be disadvantageous in comparison to polymer compositions containing PVC. In order to improve the workability, in particular the flowability, liquid components such as white oil are frequently used in the compositions which also has a cost-reducing effect. The use of white oil, for example, also has a softening effect, but white oil is lipophilic, so that as a component of a polymer composition in the sealing element of the closure it tends to undesirably migrate into contents, if the closure seals a filled and closed container. The migration of white oil is increased, if the contents contain oil or fat.

WO 2009/059788 reveals a PVC-free polymer composition for a sealing element in a closure. An example of a composition is shown there on pages 12 and 13. The example shown there contains a substantial amount of white oil at a ratio of about 33 wt.-%, whereby high migration values can be expected, if the composition is used in a closure sealing a container containing fatty or oily contents. Another example of a composition is shown on page 23 of WO 2009/059788. In this example no white oil is used, however a copolymer as main component comprising polyethylene units and a short-chain alkene monomer ($C_3$ to $C_8$). The copolymer has properties that are typical of cost-intensive olefinic block copolymers.

One object of the invention is to provide a polymer composition that may be used as sealing element in a closure, that is manufacturable at acceptable costs and shows very low migration values.

This object is achieved by a closure that is able to seal a container and that can be used in a method for the production of a sealed and filled container.

The closure has a sealing element. The sealing element comprises a polymer composition. The polymer composition comprises a butene copolymer with a melting temperature $T_m$, between 30° C. and 130° C. The melting temperature $T_m$, can be measured during a DSC measurement by means of the second heating curve at a heating rate of 10° C/min.

Typically, the closure comprises a support made of metal, plastic or metal and plastic (composite closure). The support of the closure may be coated with an adhesive varnish, especially if the support is made of metal or contains metal. The polymer composition may be applied to the support and the sealing element may be formed on it. Likewise, the sealing element may be formed outside the support and may subsequently be integrated into the support, wherein adhesion of the sealing element on the support may be caused in a different way (e.g. by means of pressure or temperature).

The sealing element may be configured disc-shaped or ring-shaped.

In the case of conventional closures, e.g. cam screw closures, the major part of the sealing element is formed in the planar area of the support, so that an upper end of a container mouth comes into contact with the sealing element when the closure is sealing a container. Particularly in the case of press-on twist-off closures (PT-closures), a considerable part of the sealing element may also be formed in the skirt area of the support. In the case of composite PT-closures, such as closures marketed under the brand name Band-Guard, a plastic thread of the closure can interact with a counter thread of a container (e.g. a glass container with an external thread).

A PT-closure is pressed onto the container mouth when the container is being sealed while the sealing element is sufficiently flowable in a heated state. An external thread at the mouth portion of the container creates an internal thread (as a negative of the external thread) in the sealing element area at the skirt of the closure support. The PT-closure is removed from the container by means of a rotational movement (twist-off).

It turned out that the use of a butene copolymer with a melting temperature $T_m$ between 30° C. and 130° C. in a polymer composition of a sealing element of a closure allows the production of closures with excellent properties.

Preferably, the melting temperature $T_m$ of the butene copolymer lies between 40° C. and 125° C. Particularly preferred, the melting temperature $T_m$, of the butene copolymer lies between 80° C. and 125° C. The melting temperature $T_m$ of the butene copolymer may also lie between 105° C. and 125° C.

The butene of the butene copolymer preferably is a 1-butene.

A comonomer of the butene copolymer may be propylene, so that the butene copolymer is a butene propylene copolymer.

The butene copolymer may be a bipolymer, so that the butene copolymer in addition to butene has exactly one further comonomer, e.g. propylene.

In the polymer composition, the butene copolymer may be contained in an amount between 0.1 wt.-% and 80 wt.-%. The butene copolymer may also be present in the polymer composition with a content between 5 wt.-% and 60 wt.-%. Preferably, the content of the butene copolymer in the polymer composition lies between 8 wt.-% and 55 wt.-%.

Percentages by weight with reference to the polymer composition refer to the percentage of the respective component relative to the total weight of all components in the polymer composition.

The polymer composition may comprise a further butene copolymer. This further butene copolymer is a kind of polymer that differs from the previously described butene copolymer. The previously described butene copolymer and the further butene copolymer in the polymer composition may differ with regard to their physical properties (e.g. density, melting temperature, hardness etc.). The butene copolymers may also differ with regard to their structure (block copolymer, random copolymers etc.). In addition, the butene copolymers may also differ with regard to the kind of their comonomers (ethylene, propylene etc.).

The butene in the further butene copolymer may be a 1-butene. Ethylene may be a comonomer of the further butene copolymer.

The percentage of the copolymerized butene of the further butene copolymer may be at least 60 mol.%, in particular at least 80 mol.%.

The further butene copolymer may be a butene bipolymer, so that the butene bipolymer in addition to the butene has exactly one further kind of a comonomer.

The further butene copolymer may be present in the polymer composition with a content between 10 wt.-% and 80 wt.-%. Preferably, the further butene copolymer is present in the polymer composition with a content between 22 wt.-% and 70 wt.-%. Specifically, the polymer composition contains between 40 wt.-% and 65 wt.-% of the further butene copolymer.

The polymer composition may comprise a polyethylene.

The polyethylene may be a homo-polyethylene. Specifically, the homo-polyethylene may be an LPDE (low-density polyethylene) or an HDPE (high-density polyethylene).

The polymer composition may comprise between 5 wt.-% and 60 wt.-% of the polyethylene. Preferably, the content of the polyethylene in the polymer composition lies between 10 wt.-% and 45 wt.-%. Specifically, the polyethylene is present in the polymer composition with a content between 15 wt.-% and 35 wt.-%.

The polymer composition may comprise a random propylene copolymer.

The random propylene copolymer may comprise ethylene as comonomer. In particular, the random propylene copolymer is a bipolymer.

Preferably, the polymer composition contains a random propylene ethylene copolymer.

The random propylene copolymer may be present in the polymer composition with a content between 5 wt.-% and 60 wt.-%. Specifically, the content of the random propylene copolymer lies between 10 wt.-% and 45 wt.-%. Particularly preferred, the content of the random propylene copolymer in the polymer composition lies between 15 wt.-% and 35 wt.-%.

The polymer composition may also comprise a butene homopolymer that is contained in the polymer composition specifically with a content between 5 wt.-% and 60 wt.-%.

Specifically, the butene of the butene homopolymer is a 1-butene.

In particular, the butene homopolymer in the polymer composition is present with a content between 10 wt.-% and 45 wt.-%. Specifically, the content of the butene homopolymer in the polymer composition lies between 15 wt.-% and 35 wt.-%.

The polymer composition may also comprise a copolymer, wherein styrene is a comonomer of the copolymer.

In particular, the copolymer comprising styrene as a comonomer, is an SBS, SEPS, SEEPS or an SEBS. Particularly preferred, the copolymer, comprising styrene as a comonomer, is an SEBS.

The styrene-containing copolymer may be present in the polymer composition with a content between 10 wt.-% and 70 wt.-%. Preferably, the content of the styrene-containing copolymer in the polymer composition lies between 20 wt.-% and 60 wt.-%. The styrene-containing copolymer may also be present in the polymer composition with a content between 35 wt.-% and 55 wt.-%.

The butene copolymer, in particular the butene propylene copolymer may be present in the polymer composition with a content of at least 80 wt.-%. The butene copolymer may also be present in the polymer composition with a content of at least 90 wt.-%. In this case, the butene copolymer, in particular the butene propylene copolymer, may be the only polymer component of the polymer composition and the polymer composition may contain only additives in addition to the butene copolymer.

Due to the advantageous composition of the polymer compositions, a high percentage of components that are liquid at 20° C. and 1000 hPa can be avoided. One example of such a component that is liquid at 20° C. and 1000 hPa is white oil. Therefore, die polymer composition preferably comprises a maximum of 10 wt.-% of a component that is liquid at 20° C. and 1000 hPa. Specifically, the polymer composition comprises a maximum of 5 wt.-% of such a component. In particular, the polymer composition does not comprise such a component at all (within the analytical possibilities on the date of filing).

The polymer composition may be a polyolefin composition. Accordingly, the polymer composition exclusively comprises polyolefins as polymer components. Additives may be present in the polymer composition, even if they are no polyolefins and if the polymer composition is a polyolefin composition.

Preferably, the polymer composition does not contain PVC (polyvinylchloride) at all.

It is preferred that the polymer composition does not contain an oxygen scavenger.

The polymer composition may be configured in such a way that it has a static friction coefficient of not more than 0.50, preferably not more than 0.40. The friction coefficient is determined according to DIN EN ISO 8295. A low friction coefficient of the polymer composition allows the closure to be used advantageously, in particular in the process of sealing a container with the closure, where friction occurs between the sealing element of the closure and the container, and for opening a container sealed with a closure.

A low friction coefficient often is difficult to achieve, in particular in the case of a low percentage of components that are liquid at 20° C. and 1000 hPa.

The polymer composition characteristically comprises additives. Preferably, the polymer composition comprises a maximum of 15 wt.-% additives. Specifically, the polymer composition comprises a maximum of 8 wt.-% additives. Particularly preferred, a maximum of 6 wt.-% is contained in the polymer composition.

The additives used can be chosen from the group: pigments, nucleating agents, brighteners, stabilizers, tensides, lubricants, antioxidants or combinations thereof.

The polymer composition may comprise a content between 43 wt.-% and 57 wt.-% of the butene copolymer and between 43 wt.-% and 57 wt.-% of the further butene copolymer.

The polymer composition specifically comprises between 8 wt.-% and 16 wt.-% of the butene copolymer, between 55 wt.-% and 65 wt.-% of the further butene copolymer and between 18 wt.-% and 30 wt.-% of the homo-polyethylene (in particular LDPE or HDPE).

Preferably, the polymer composition comprises between 8 wt.-% and 16 wt.-% of the butene copolymer, between 55 wt.-% and 65 wt.-% of the further butene copolymer and between 18 wt.-% and 30 wt.-% of the random propylene copolymer.

Specifically, the polymer composition comprises between 8 wt.-% and 16 wt.-% of the butene copolymer, between 55 wt.-% and 65 wt.-% of the further butene copolymer and between 18 wt.-% and 30 wt.-% of the butene homopolymer.

The polymer composition may comprise between 8 wt.-% and 16 wt.-% of the butene copolymer, between 55 wt.-% and 65 wt.-% of the further butene copolymer, between 3 wt.-% and 12 wt.-% of the homo-polyethylene (in particular LDPE) and between 10 wt.-% and 22 wt.-% of the random propylene copolymer.

As mentioned above, the closure may comprise a support and the sealing element. The support may comprise a planar portion and a skirt portion. Specifically, the support may comprise metal, plastic or metal and plastic. In particular, the main component of the support is metal or plastic, in particular metal.

The closure may be a screw closure. Preferably, the closure is a cam screw closure. The closure may also be a press-on twist-off closure or a composite closure.

Preferably, the polymer composition shows an oxygen permeability rate of less than 500 $cm^3$ $m^{-2}$ $d^{-1}$ $bar^{-1}$, preferably of less than 400 $cm^3$ $m^{-2}$ $d^{-1}$ $bar^{-1}$. The oxygen permeability rate may be determined according to DIN 53380. A low oxygen permeability rate of the polymer composition results in a low ingress of oxygen into a container that is sealed with described closures. A longer durability of a content in a filled and sealed container can thus be ensured.

The total migration of the polymer composition may be a maximum of 1.2 mg $cm^{-2}$, preferably a maximum of 1.0 mg $cm^{-2}$, particularly preferred a maximum of 0.8 mg $cm^{-2}$, wherein the total migration of the polymer composition can be determined according to DIN-EN 1186-14.

If a filled container is sealed by means of a closure with a sealing element made of the polymer composition and in the case of a surface/mass ratio of 1 $cm^{-2}$ contact surface of the sealing element to 0.02 kg mass of the contents within the container, a total migration threshold value of 60 mg $kg^{-1}$ is complied with.

It is preferred that the sealing element of the closure consists of the polymer composition, which means, for example, that the sealing element does not comprise any additional foil applied thereto.

A disclosed closure can seal a container. The container comprises a container mouth and a sealable opening at the end of the container mouth. This opening is sealed by one of the disclosed closures.

The container may be a glass container, a plastic container or a metal container. In particular, the container is a glass container.

The closure sealing the opening of the container may comprise a support and the sealing element. The support may have a lower side and the container mouth may have an upper end. Typically, the sealing element of the closure is clamped between the container mouth and the closure support, so that the sealing element fits closely to both the upper end of the container mouth and the lower side of the support. Specifically, the height of the sealing element between the upper end of the container mouth and the lower side of the support is 1.0 mm at the most. Preferably, this height is 0.8 mm at the most and particularly preferred 0.7 mm at the most. The height may be determined in an axial direction of the container.

Analogously, the height of the sealing element between the upper end of the container mouth and the lower side of the support may amount to at least 0.2 mm. Specifically, the height amounts to at least 0.4 mm and particularly preferred to at least 0.5 mm. The measurement of the height of the sealing element may be carried out in an axial direction of the container.

Particularly preferred, the height of the sealing element between the upper end of the container mouth and the lower side of the support lies between 0.3 mm and 0.9 mm.

If, for example, the height of the sealing element amounts to 1.2 mm before the closure is applied onto a container, an impression of the upper end of the container mouth into the sealing element (height between upper end of the container mouth and lower side of the support of not more than 1.0 mm) ensures, without the sealing element being cut through (height of the sealing element between upper end of the container mouth and lower side of the support at least 0.2 mm), a high tightness of the container sealed with the closure.

Preferably, there is a vacuum within the sealed container. The absolute pressure within the sealed container may amount to a maximum of 200 hPa. Specifically, the absolute pressure within the sealed container amounts to a maximum of 100 hPa.

The container sealed with the closure may have a safety dimension of a maximum of 10 mm, specifically, the safety dimension is a maximum of 8 mm. Preferably, the safety dimension amounts to a maximum of 6 mm. Particularly preferred, the safety dimension amounts to a maximum of 4 mm.

For determining the safety dimension, a container sealed with a cam screw closure is stored at room temperature (23° C.) for a period of 30 minutes. The relative position of the closure to the container is marked by applying a marking to the closure skirt and the container wall in such a way that the circumferential distance between the marking on the closure skirt and the container wall is zero. The markings lie on a straight line that is parallel to the longitudinal axis of the container. Subsequently, the closure is removed completely from the container by means of screwing-off. Thereafter, the closure is placed on the container and screwed on until a slight noticeable resistance occurs. The closure is thus screwed on finger-tight. Subsequently, the circumferential distance between the marking on the closure skirt and the marking on the container wall is measured. The measured distance corresponds to the safety dimension expressed in mm.

Due to the, at least sectionwise, steep pitch of the threads of containers and cam screw closures, the precision of the measurement of the safety dimension is high, since the point, at which a slight resistance (finger-tight) is noticeable during screwing-on of the closure can be determined precisely. Typically, the precision of the measurement of the safety dimension at sealed containers that were closed under the same conditions by different persons is about ±1 mm.

An appropriate safety dimension ensures that the sealing element will exert an elastic force on at least the upper end of the container mouth, when the container is sealed with the closure. This results in a high tightness of the interior of the sealed container.

A sealed and filled container can be produced by providing a container with a container mouth and a sealable opening at the end of the container mouth. The container is filled with a (solid and/or liquid) foodstuff through the opening of the container and the opening of the container is sealed with a disclosed closure.

The opening of the container may have a diameter of at least 20 mm. In particular, the diameter of the container opening amounts to a maximum of 120 mm.

The container may be a glass container, a plastic container or a metal container.

The closure may be treated at a temperature of at least 90° C. before the opening of the container is sealed with the closure. Such a treatment may be carried out with water vapor, by way of example.

Within the container, a headspace can be formed after the container has been filled with the foodstuff. The headspace within the container after filling is the portion of the container content, in which no foodstuff is present. It is possible to feed vapor to the headspace before applying the closure to the container and thus sealing the opening of the container. In particular, the vapor may be water vapor.

The absolute pressure within the sealed and filled container may amount to a maximum of 200 hPa. Specifically, the pressure within the sealed and filled container may amount to a maximum of 100 hPa.

For the creation of an impression of the container mouth into the sealing element, the sealing element can be deformed in an axial direction of the container by at least 0.2 mm during sealing of the opening of the container with the closure and/or during a thermal treatment of the sealed and filled container. Preferably, this deformation of the sealing element amounts to at least 0.4 mm. Specifically, the deformation amounts to at least 0.5 mm.

Analogously, the sealing element may be deformed by a maximum of 1.0 mm for creating an impression of the container mouth into the sealing element during sealing of the opening of the container with the closure and/or during a thermal treatment of the sealed and filled container. In particular, the deformation amounts to a maximum of 0.8 mm. More preferable, the deformation amounts to a maximum of 0.7 mm. This refers in each case to an axial direction of the container Most preferable, the deformation of the sealing element amounts to between 0.3 mm and 0.9 mm.

The foodstuff may be filled into the container aseptically. The foodstuff may also be filled into the container at a temperature of a maximum of 10° C. The foodstuff may also be filled into the container at a temperature between 10° C. and 70° C.

Likewise, the foodstuff may be filled into the container at a temperature between 70° C. and 98° C.

The sealed and filled container may be treated thermally in the course of the process. In so doing, the temperature of the thermal treatment lies above the temperature of the (solid and/or liquid) foodstuff during filling of the latter into the container.

The thermal treatment may be carried out at a temperature of at least 60° C.

The thermal treatment may also be carried out at a temperature of a maximum of 135° C. (between 60° C. and 135° C.). In particular, the thermal treatment is carried out at a temperature of up to 135° C. (between 60° C. and 135° C.) at an absolute ambient pressure of a maximum of 4.0 bar, preferably at an absolute ambient pressure between 1.0 bar and 4.0 bar.

Preferably, the pressure within the sealed container during a thermal treatment is lower than the pressure outside the sealed container.

The embodiments of the invention are shown on the basis of an example and not in a way that allows limitations from the figures to be transferred or read into the claims. Like reference numerals in the figures stand for like elements.

FIG. 1 shows a side view of a cam screw closure 1 with an annular sealing element 3, partially as a section;

FIG. 2 shows a side view of the cam screw closure 1 with the sealing element 3 on a container 5, partially as a section;

Figure 2:
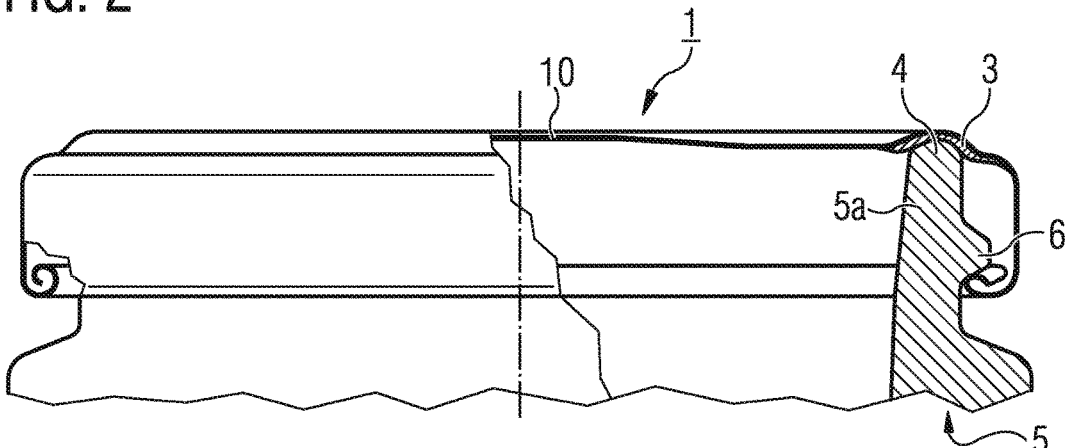
Figure 4:
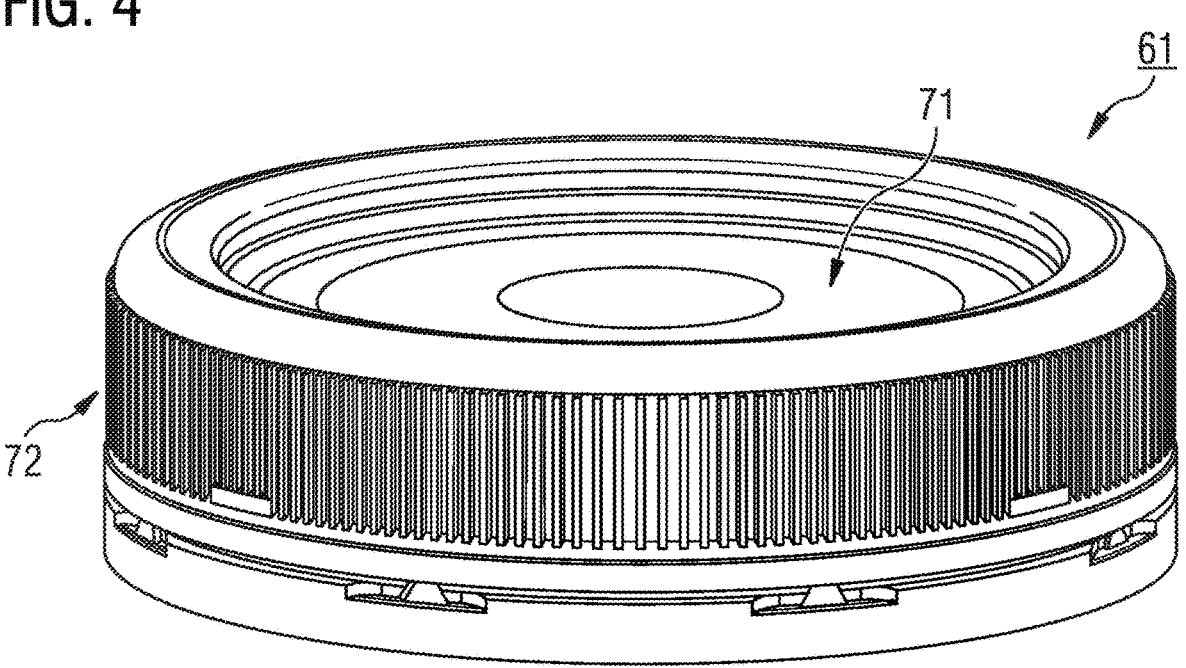
FIG. 4 shows an isometric view of a composite closure 61 (combi-twist)
Figure 5:
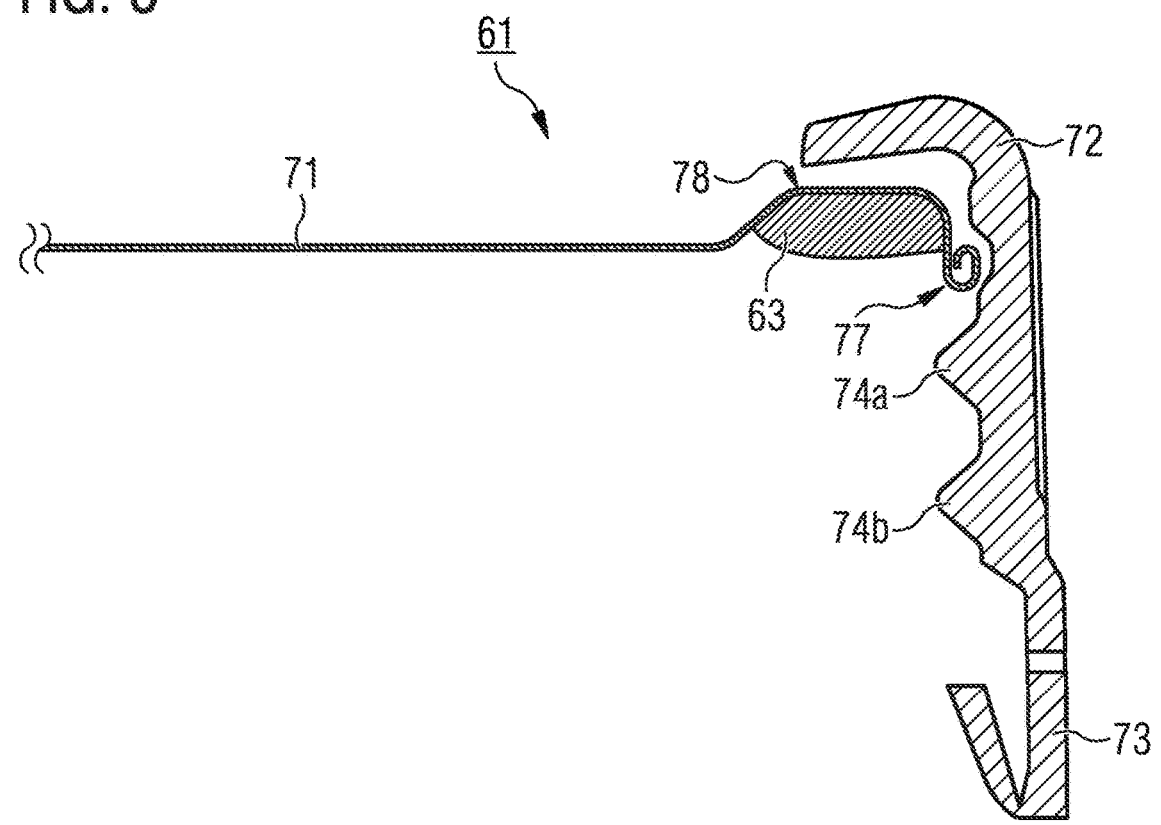
Figure 6:
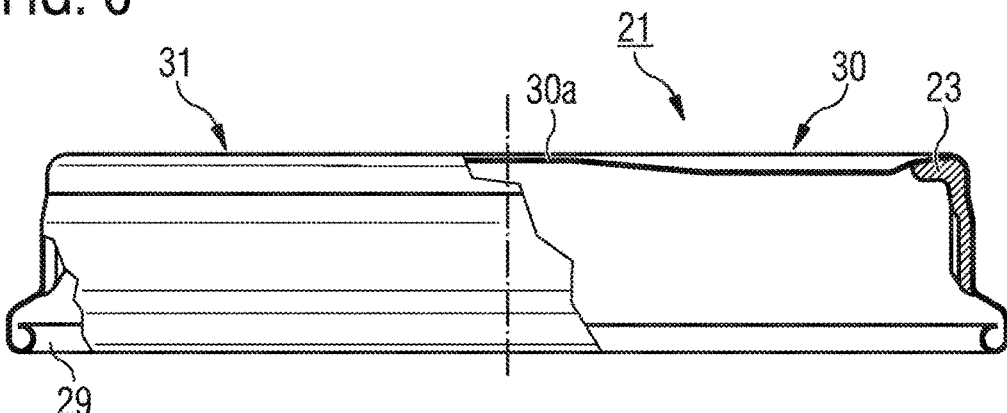
Figure 7:
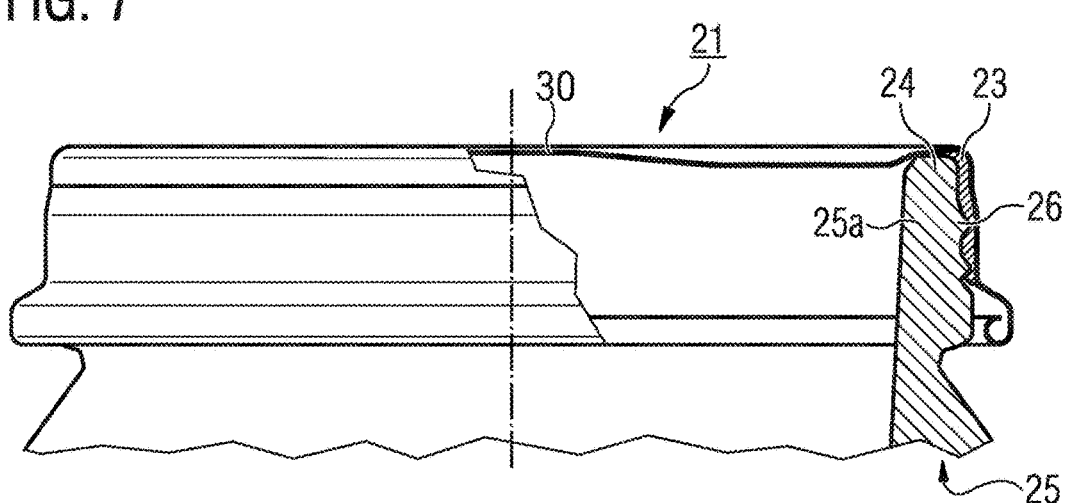
Figure 8:
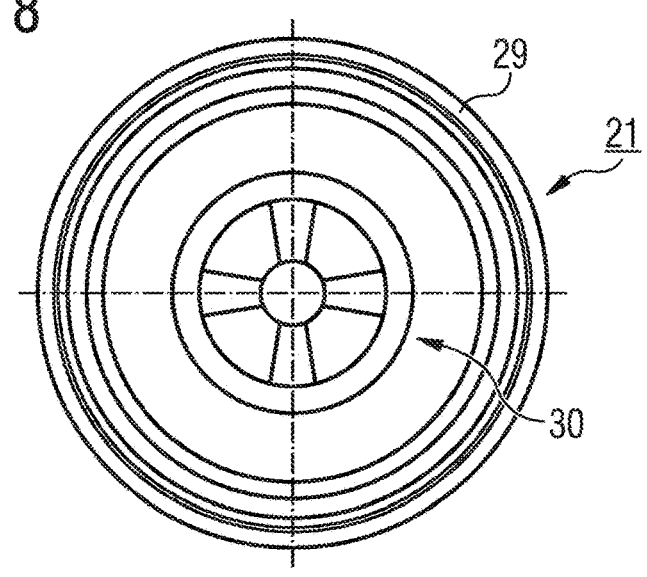
Figures 10, 11:
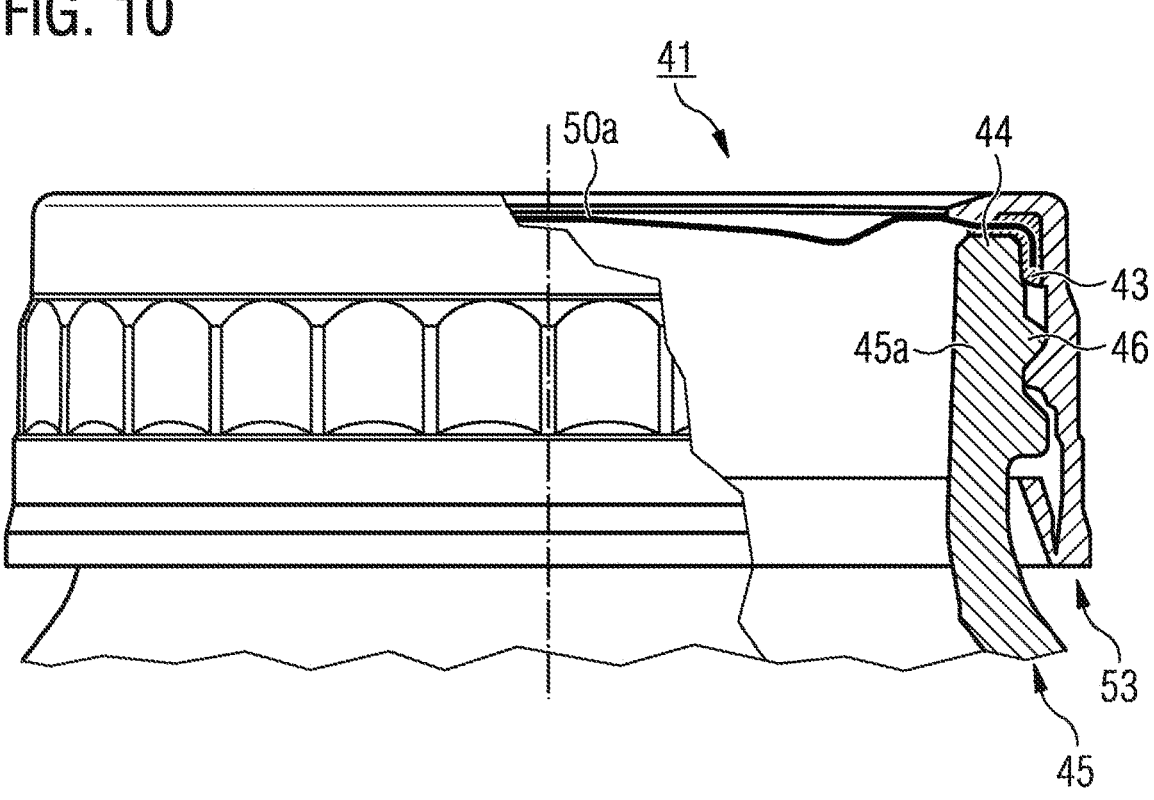
Figure 12:
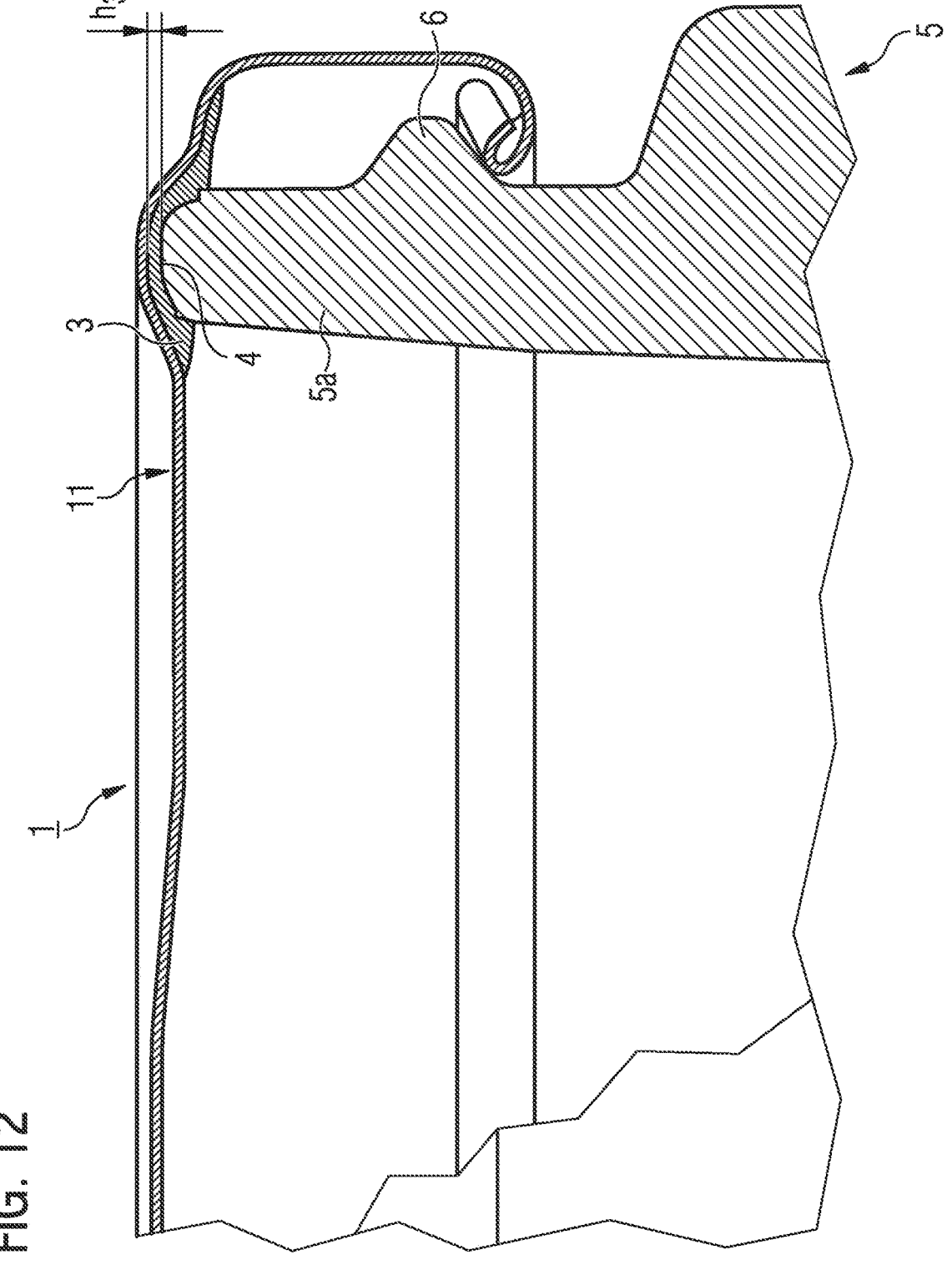

FIG. 5 partially shows an axial section of the composite closure 61 (combi-twist) of FIG. 4;

FIG. 6 shows a side view of a press-on twist-off closure 21 (PT-closure) with a sealing element 23, partially as a section;

FIG. 7 shows a side view of the PT-closure 21 with the sealing element 23 on a container 25, partially as a section;

FIG. 8 shows a top view of the PT-closure 21;

Figure 9:
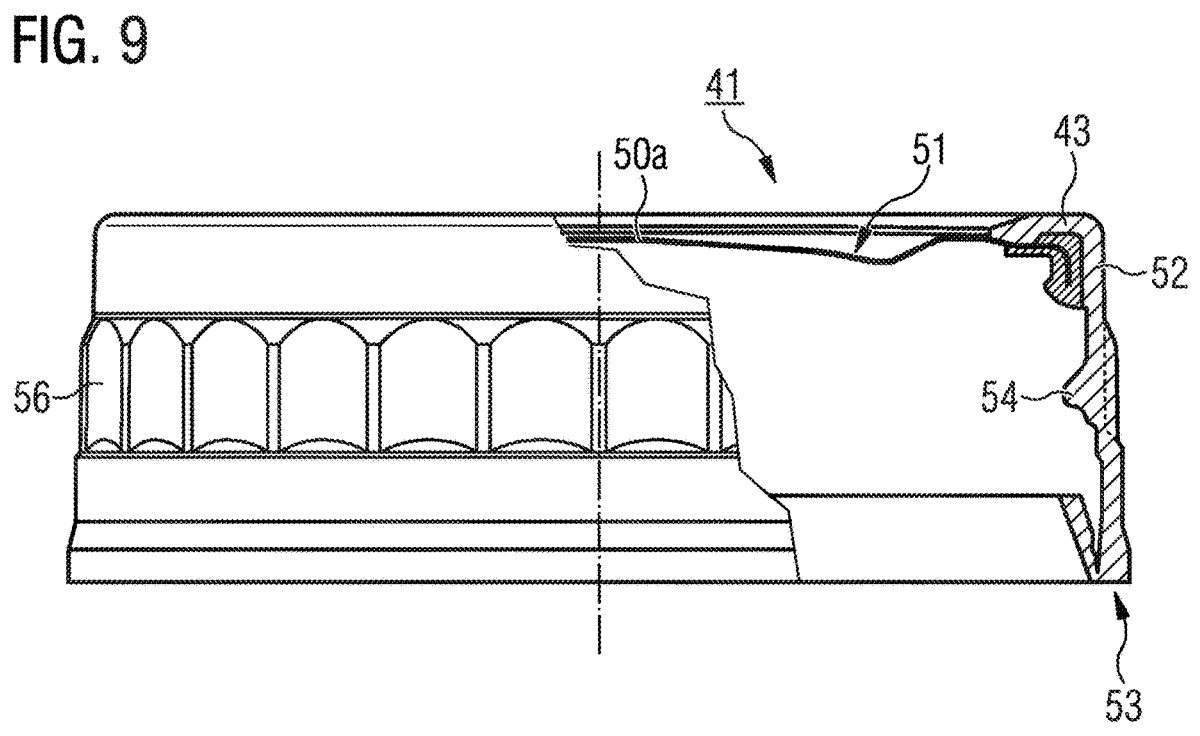

FIG. 9 shows a side view of a composite closure 41 (Band-Guard) with a sealing element 43, partially as a section;

FIG. 10 shows a side view of the composite closure 41 (Band-Guard) with the sealing element 43 at a container 45, partially as a section;

FIG. 11 shows a top view of the composite closure 41 (Band-Guard);

FIG. 12 shows an enlarged detail of the cam screw closure of FIG. 2.

Figure 1:
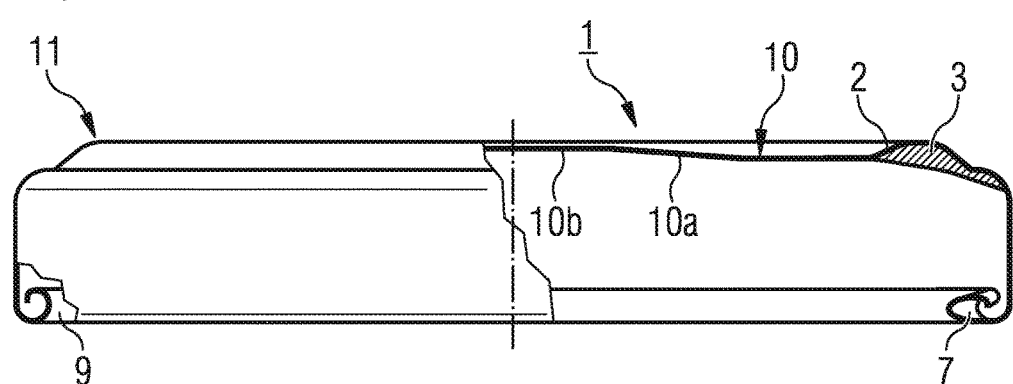
Figure 3:
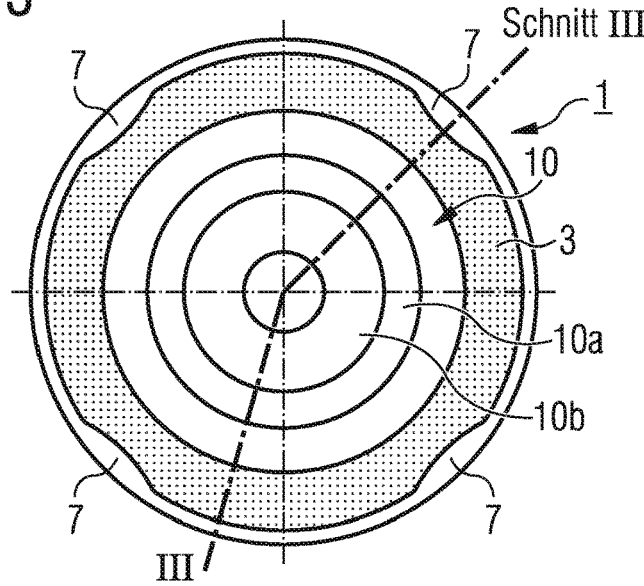
FIG. 3 shows the cam screw closure 1 with the sealing element 3 in a view from below.

FIGS. 1 and 3 show a cam screw closure 1. The cam screw closure 1 comprises a metallic support 11 and a sealing element 3. In the illustration of FIG. 2, the cam screw closure 1 is applied to a container 5. At the lower end of the cam screw closure 1, a curled portion 9 is formed. Circumferentially distributed, several cams 7 are formed out of the curled portion. The cams 7 are formed by an axial deformation of the curled portion 9 and radially extend farther towards the center of the cam screw closure 1 than the curled portion 9. The cam screw closure 1 shown in FIGS. 1 to 3 comprises four cams 7 that are configured such that they are circumferentially evenly distributed. The sections that are partially shown in FIGS. 1 and 2 correspond to section III-III in FIG. 3.

Close to the radially outer end section of the cam screw closure 1, a channel 2 is configured in the upper portion 10 of the support 11. The sealing element 3 is at least partially arranged within the channel 2. In this embodiment, the sealing element 3 has an annular shape, in other embodiments, the sealing element 3 may be disc-shaped, especially if the diameter of the cam screw closure is small (e.g. not more than 30 mm).

For adhesion between the metallic support 11 and the sealing element 3, an adhesive varnish is typically applied to the side of the metallic support 11 that is in contact with the sealing element 3.

In FIG. 2, the cam screw closure 1 is applied to a container 5. The container 5 comprises a container mouth 5a as an upper portion of the container 5. The container mouth comprises a thread 6 and an upper end 4 of the container mouth 5a. The thread 6 is configured as a circumferential thread in the area of the container mouth 5a and extends circumferentially upwards or downwards (depending on the angle of view).

In order to apply a cam screw closure 1 onto a container 5, cams 7 are brought into contact with sections of the thread 6 and the cam screw closure 1 is rotated clockwise relative to the container 5. Due to the structural design of the thread 6 and the interaction of the cams 7 with the thread 6, the upper end 4 of the container mouth 5a moves towards the sealing element 3 during the rotary movement of the cam screw closure 1 relative to the container 5. Through a further rotary movement of the cam screw closure 1, the upper end 4 of the container mouth 5a is impressed into the sealing element 3, thus deforming it, so that a portion of the upper end 4 of the container mouth 5a is covered by the sealing element 3, whereby the container 5 is closed tightly. A tight sealing of the container 5 is in particular necessary in order to withstand an increased pressure during a thermal treatment of the sealed container 5 at temperatures above 70° C., 90° C. or even above 120° C.

The cam screw closure 1, as shown in FIGS. 1 to 3, comprises a safety button 10b that is formed in the upper portion 10 of the support 11. Due to the incline 10a at the upper portion 10 of the support 11, the safety button 10b will tilt towards the middle of the container, if there is a sufficiently high negative pressure within the container. Such a vacuum can be produced by introducing water vapor into the container before sealing the container with the closure.

When a consumer opens the container by removing the closure, the pressure within the container increases to ambient pressure and the safety button 10b tilts away from the middle of the container. The tilting process of the safety button 10b is accompanied by a characteristic sound indicating to the consumer that there was a vacuum in the container before the latter was opened.

FIGS. 4 and 5 show a composite closure 61 (combi-twist) that can be applied to a container analogously to the described cam screw closure 1 by means of a rotary movement and that can be removed from the container by a rotary movement.

The composite closure 61 comprises a support with an upper metallic portion 71 and a plastic portion 72 in L-shape. Close to the radial end of the metallic portion 71 of the support, a channel 78 is formed and a curled portion 77 is configured at the radial end of the metallic portion 71. A sealing element is arranged at least partially within the channel 78.

Several thread elements 74a, 74b, formed on the inner side of the plastic portion 72, are in contact with a counter thread in the area of the mouth of a container (not shown) onto which the composite closure 61 is to be applied. The plastic portion 72 of the composite closure 61 further comprises a tamper evidence 73 that is configured similar to the tamper evidence shown in FIGS. 9 to 11 and that will be described in more detail with regard to FIGS. 9 to 11.

When the composite closure 61 is screwed onto a container by means of a rotary movement, this results in an interaction of the container mouth of the container with the sealing element of the composite closure 61 analogous to that described with reference to the cam screw closure 1.

In FIGS. 6 to 8, a press-on twist-off closure 21 (PT-closure) is shown. The PT-closure 21 comprises a metallic support 31 with a curled portion 29 at the lower end of the support 31 and a safety button 30a in the upper portion 30 of the support 31.

A sealing element 23 is formed both in the area of the upper portion 30 of the support 31 and, to a considerable extent, at the skirt of the support extending downwards from the upper portion 30 of the support 31. In contrast to the cam screw closure 1 and the composite closure 61, the PT-closure 21 is pressed onto the container mouth 25a when it is being applied to a container 25. While it is being pressed onto the container mouth 25a, the sealing element 23 is sufficiently soft to elastically enclose thread elements 26 of the container mouth 25a. For this purpose, the sealing element 23 is typically treated with water vapor before the PT-closure 21 is applied onto a container 5, so as to achieve the necessary softness of the sealing element 23. When the sealing element 23 has cooled down, a counter thread in the form of a negative of the thread elements 26 of the container mouth has been formed in the sealing element 23.

An upper end 24 of the container mouth 25a contacts the sealing element 23.

For opening the container 25, the PT-closure 21 is removed from the container 25 by means of a rotary movement.

FIGS. 9 to 11 show a composite closure 41 (Band-Guard) that is capable of operating analogously to the described PT-closure 21.

The composite closure 41 comprises a support with a metallic portion 51 and a plastic portion 52, a tamper evidence 53 and a safety button 50a. The tamper evidence 53 is configured in such a way that it is removed from the rest of the composite closure 41, when the composite closure 41 is removed from a container 45, and serves to give a customer the possibility to check whether the composite closure 41 had already been removed from the container 45 before. The safety button 50a is configured and capable of operating analogously to the safety button 10b of the cam screw closure 1.

The plastic portion of the composite closure 41 may comprise several axially extending recesses 56 in order to increase the stability of the closure.

A sealing element 43 is arranged in the composite closure 41 in such a way that it contacts both the metallic portion 51 as well as the plastic portion 52. For sealing a container 45, the composite closure 41 in pressed onto the container mouth 45a of the container 45, so that at least the upper end 44 of the container mouth 45a contacts the sealing element 43.

The plastic portion 52 of the support comprises several offset protrusions 54 that interact with thread elements 46 of the container mouth 45a. For opening a container 45 that is sealed with the composite closure 41, the composite closure 41 may be rotated relative to the container 45.

The distance $h_3$ of a sealing element 3 between an upper end 4 of a container mouth 5a of a container 5 and the lower side of a support 11 of the closure 1 is shown in FIG. 12 with view to a cam screw closure 1 and is described here. The distance (height) $h_3$ for other closure-types is to be determined analogously.

The sealing element 3 clamped between the container mouth 5 and the support 11 of the closure 1 has a height $h_3$ that is given, when a container 5 is sealed with the closure 1. If the height $h_3$ is too small, there is the risk that the sealing element 3 may be cut through, whereby the tightness of the sealed container 5 might be affected. If the height $h_3$ is too big, the tightness of the sealed container is affected, since the contact area between the upper end 4 of the container mouth 5a and the sealing element 3 is not large enough. In order to achieve a suitable impression of the upper end 4 of the container mouth 5a into the sealing element, the composition of the sealing element 3 is of decisive importance.

EXAMPLES

Examples of polymer compositions for sealing elements in a closure are shown in tables 1 and 2.

TABLE 1

| | Example 1 | Example 2 | Example 3 | Example 4 |
|---|---|---|---|---|
| Component | | | | |
| Butene propylene copolymer, wt.-% | 94.9 | 47.5 | 12.0 | 12.0 |
| Butene ethylene copolymer, wt.-% | | 47.4 | 59.9 | 59.9 |
| LDPE, wt.-% | | | 23.0 | |

TABLE 1-continued

| | Example 1 | Example 2 | Example 3 | Example 4 |
|---|---|---|---|---|
| HDPE, wt.-% | | | | 23.0 |
| Random propylene ethylene-copolymer, wt.-% | | | | |
| Homo-polybutene, wt.-% | | | | |
| Additives, wt.-% | 5.1 | 5.1 | 5.1 | 5.1 |
| Characteristics | | | | |
| Friction coefficient, dimensionless | 0.32 | 0.26 | 0.23 | 0.17 |
| Total migration, mg cm$^{-2}$ | 0.56 | 0.79 | 0.88 | 0.83 |
| Oxygen permeability rate, cm$^3$ m$^{-2}$ d$^{-1}$ bar$^{-1}$ | 370 | 364 | 409 | 307 |

TABLE 2

| | Example 5 | Example 6 | Example 7 |
|---|---|---|---|
| Component | | | |
| Butene propylene copolymer, wt.-% | 12.0 | 12.0 | 12.0 |
| Butene ethylene copolymer, wt.-% | 59.9 | 59.9 | 59.9 |
| LDPE, wt.-% | | | 7.0 |
| HDPE, wt.-% | | | |
| Random propylene ethylene copolymer, wt.-% | 23.0 | | 16.0 |
| Homo-polybutene, wt.-% | | 23.0 | |
| Additives, wt.-% | 5.1 | 5.1 | 5.1 |
| Characteristics | | | |
| Friction coefficient, dimensionless | 0.19 | 0.20 | 0.17 |
| Total migration, mg cm$^{-2}$ | 1.05 | 0.81 | 0.96 |
| Oxygen permeability rate, cm$^3$ m$^{-2}$ d$^{-1}$ bar$^{-1}$ | 413 | 325 | 368 |

The butene propylene copolymer has a melting temperature of 114° C., determined according to ISO 11357-3.

A typical value of the oxygen permeability rate of PVC-containing compositions that are utilized as sealing elements in closures lies at approximately 220 cm$^3$ m$^{-2}$ d$^{-1}$ bar$^{-1}$.

The oxygen permeability rates of known, commercially available PVC-free compositions in closures typically amount to 650 cm$^3$ m$^{-2}$ d$^{-1}$ bar$^{-1}$ and more. Often oxygen scavengers are added to these known compositions in order to reduce the presence of oxygen in a container that is sealed with such a closure.

The PVC-free polymer compositions disclosed herein show oxygen permeability rates that are close to the rates of PVC-containing compositions. The oxygen permeability rates of the compositions disclosed herein lie clearly below the oxygen permeability rates of known PVC-free compositions.

By means of a polymer composition having a low oxygen permeability rate, the use of oxygen scavenger materials in the polymer composition can be avoided and at the same time a low ingress of oxygen into the filled container will be guaranteed.

The butene propylene copolymer is available e.g. from LyondellBasell.

The butene ethylene copolymer used is available e.g. from LyondellBasell. The copolymerized share of butene may amount to at least 80 mol.-%.

LDPE and HDPE are commercially available from various providers.

The random propylene ethylene copolymer is available from Borealis.

Homo-polybutene is available from LyondellBasell.

SEBS is available from Kraton, for example from the Kraton G-series.

The invention claimed is:

1. A closure having a sealing element, wherein
(a) the sealing element comprises a polymer composition;
(b) the polymer composition comprises a butene copolymer, wherein the butene copolymer has a melting temperature T$_m$ between 105° C. and 125° C., wherein the melting temperature T$_m$ is determined by the second heating curve of a DSC-measurement at a heating rate of 10° C. min$^{-1}$;
(c) wherein the sealing element is disc-shaped or ring-shaped;
(d) wherein propylene is a comonomer of the butene copolymer; and
(e) wherein the butene copolymer having propylene as a comonomer is the only butene copolymer having propylene as a comonomer in the polymer composition.

2. The closure according to claim 1, wherein the polymer composition comprises a further butene copolymer, wherein the further butene copolymer is a different kind of polymer.

3. The closure according to claim 2, wherein one comonomer of the further butene copolymer is ethylene.

4. The closure according to claim 2, wherein the further butene copolymer is a butene bipolymer.

5. The closure according to claim 2, wherein the further butene copolymer is in the polymer composition at between 10 wt.-% and 80 wt.-%.

6. The closure according to claim 1, wherein the polymer composition further comprises a polyethylene.

7. The closure according to claim 6, wherein the polyethylene is a homo-polyethylene.

8. The closure according to claim 6, wherein the polyethylene is in the polymer composition at between 5 wt.-% and 60 wt.-%.

9. The closure according to claim 1, wherein the polymer composition further comprises a butene homopolymer.

10. The closure according to claim 9, wherein the butene homopolymer is in the polymer composition at between 5 wt. % and 60 wt. %.

11. The closure according to claim 1, wherein the polymer composition further comprises a copolymer comprising styrene as a comonomer.

12. The closure according to claim 11, wherein the copolymer comprising styrene as a comonomer is in the polymer composition at between 10 wt.-% and 70 wt. %.

13. The closure according to claim 1, wherein the polymer composition further comprises from 0 to a maximum of 10 wt.-% homo-polypropylene.

14. The closure according to claim 1, wherein the closure is a screw closure.

15. The closure according to claim 1, wherein the closure is a lug closure.

16. A closure having a sealing element, wherein (a) the sealing element comprises a polymer composition;

(b) the polymer composition comprises a butene copolymer, wherein the butene copolymer has a melting temperature $T_m$ of at least 105° C, wherein the melting temperature $T_m$ is determined by the second heating curve of a DSC-measurement at a heating rate of 10° C. $min^{-1}$:

(c) wherein the closure is a lug closure, a press-on twist-off closure or a composite closure; and (d) wherein the butene copolymer is the only polymeric component in the polymer composition.

17. The closure according to claim 16, wherein the melting temperature $T_m$ of the butene copolymer is less than 125° C.

18. The closure according to claim 16, wherein the butene copolymer is a bipolymer.

19. The closure according to claim 16, wherein the butene copolymer is container in the polymer composition at between 0.1 wt.-% and 80 wt.-%.

20. The closure according to claim 16, wherein the butene copolymer is in the polymer composition in an amount of at least 80 wt.-%.

21. The closure according to claim 16, wherein the polymer composition further comprises from 0 to a maximum of 10 wt.-% of a component that is liquid at 20° C. and 1000 hPa.

22. The closure according to claim 16, wherein the polymer composition has a static friction coefficient, determined according to DIN EN ISO 8295, of a maximum of 0.50.

23. The closure according to claim 16, wherein the polymer composition comprises one or more additives at up to 15 wt.-%.

24. The closure according to claim 23, wherein the one or more additives are selected from the group consisting of: pigments, nucleating agents, brighteners, stabilizers, tensides, lubricants, antioxidants and combinations thereof.

25. The closure according to claim 16, wherein the closure further comprises a support and wherein the support comprises metal and/or plastic.

26. The closure according to claim 16, wherein the polymer composition has an oxygen permeability rate, determined according to DIN 53380, of less than 500 $cm^3$ $m^{-2} d^{-1} bar^{-1}$.

27. The closure according to claim 16, wherein the polymer composition has a total migration, determined according to DIN-EN 1186-14, of a maximum of 1.20 mg $cm^{-2}$.

28. The closure according to claim 16, wherein the sealing element consists of the polymer composition.

29. The closure according to claim 16, wherein the closure is a lug closure.

* * * * *